UNITED STATES PATENT OFFICE 2,003,457

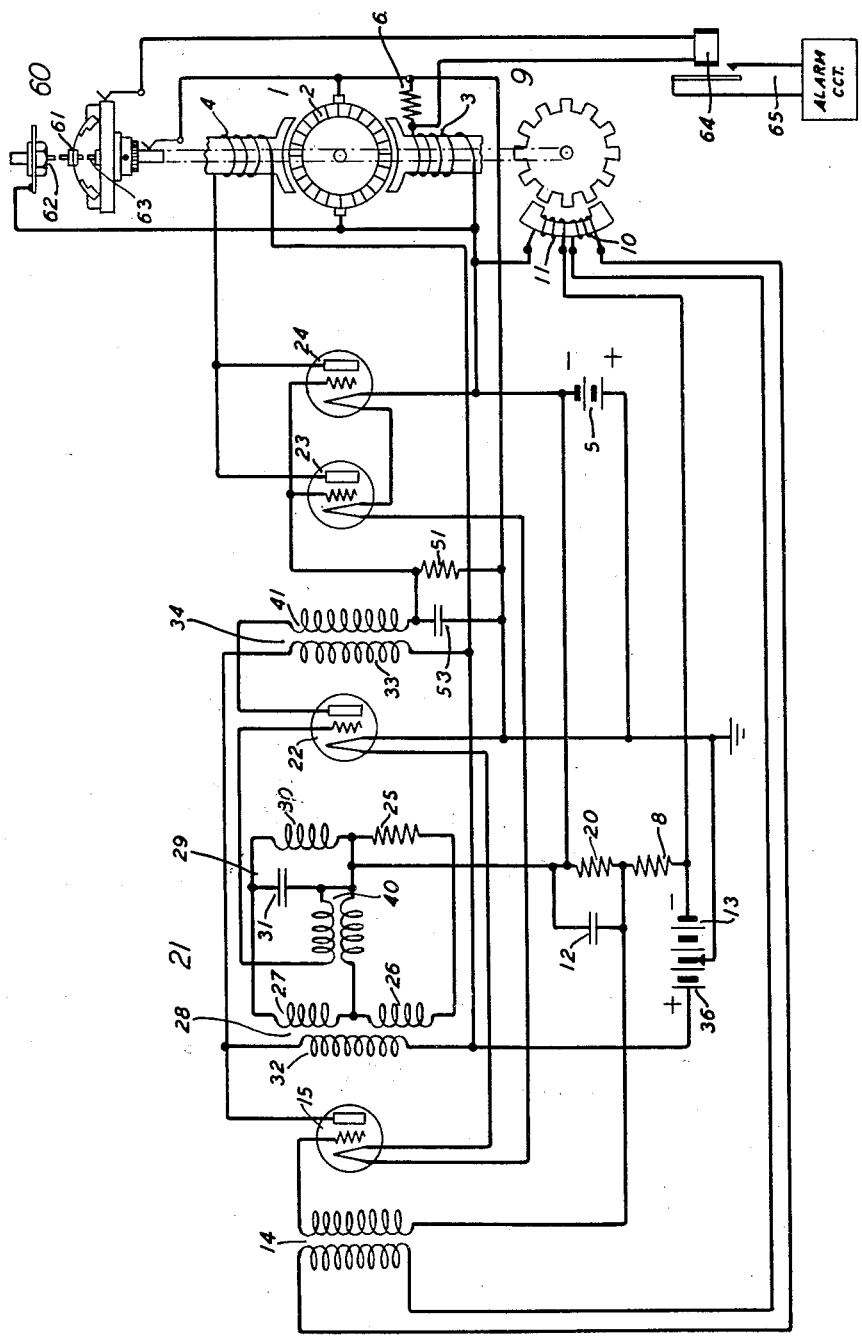

REGULATOR CIRCUIT

Edmund R. Morton, New York, N. Y., assignor to Bell Telephone Laboratories, Incorporated, New York, N. Y., a corporation of New York Application October 20, 1933, Serial No. 694,372

6 Claims. (Cl. 171—312)

This invention relates to regulator circuits for dynamo-electric machines and particularly to speed-regulator circuits for motors.

One object of the invention is to provide a motor with normally operative precision speed-regulator circuits and with auxiliary speed-regulator circuits that shall become operative in case the motor speed becomes abnormally low or abnormally high.

Another object of the invention is to provide a motor with speed-regulator circuits that shall maintain the motor speed substantially constant with close precision under normal conditions and with auxiliary speed-regulator circuits that shall maintain the motor speed roughly constant in case of failure of the precision speed-regulator circuits.

A further object of the invention is to provide a motor with speed-regulator circuits comprising space discharge devices that shall maintain the motor speed substantially constant with close precision under normal conditions and with auxiliary speed-regulator circuits controlled by a centrifugal governor that shall maintain the motor speed roughly constant in case of failure of the precision speed regulator circuits.

In the patent to E. R. Morton No. 1,788,733 dated January 13, 1931 circuits are disclosed for maintaining the speed of a motor constant with very close precision. The motor disclosed in the Morton Patent No. 1,788,733 is employed to drive a carrier current generator used in voice frequency carrier telegraph systems. In such system it is not only necessary to maintain the speed of the generator constant with close precision but it is necessary to maintain uninterrupted operation of the generator.

The present invention provides auxiliary regulator circuits for overpowering the motor precision regulator circuits and for controlling the motor to maintain the speed thereof roughly constant in case the speed of the motor becomes abnormally high or abnormally low.

In the circuits employed to describe the invention a motor having a regulating field winding and a shunt field winding is normally maintained at constant speed with close precision by the regulator circuits disclosed in the E. R. Morton Patent No. 1,788,733. The precision regulation of the motor speed is effected by controlling the excitation of the regulating field winding. Auxiliary regulator circuits are provided for overpowering the precision regulator circuits and for controlling the excitation of the motor shunt field winding when the motor speed becomes abnormally high or abnormally low.

The precision regulator circuits employed to maintain the motor speed substantially constant are controlled by an alternating current having a frequency varying according to the motor speed. The regulator circuits may be supplied with an alternating current by a pilot generator operated by the motor or by the generator supplying carrier current to the voice frequency carrier telegraph circuits. In the system employed to describe the invention a pilot generator is shown connected to the propelling motor. The pilot generator supplies to a Wheatstone bridge an alternating current which varies in frequency according to the speed of the motor. The Wheatstone bridge has one reactance arm which is tuned to the frequency of current supplied by the pilot generator when the motor is operating at normal speed. An amplifier having a limited power output is connected between the armature winding of the pilot generator and the Wheatstone bridge circuit. A phase detector tube has the input circuit thereof connected to two vertices of the Wheatstone bridge circuit and the plate circuit thereof connected to the output circuit of the amplifier having a limited power output. The Wheatstone bridge circuit serves to vary the phase of the potential impressed on the grid of the phase detector tube with respect to the phase of the current impressed on the plate according to the speed variations of the motor.

The output circuit of the phase detector tube is coupled to two regulator tubes by means of a resistance element shunted by a condenser. The regulator tubes are directly connected to the regulating field winding of the motor to control the motor excitation so as to maintain the motor speed constant. The condenser which shunts the coupling resistance between the phase detector tube and the regulator tubes serves to effect delayed precision in the operation of the regulator system and thus serves to stabilize the regulating operation and prevent hunting action.

In case the precision regulator circuits fail to maintain the motor speed within predetermined limits and the motor speed becomes abnormally low or abnormally high, auxiliary regulator circuits are provided under the control of a centrifugal governor for roughly maintaining the motor speed substantially constant. The centrifugal governor, which is preferably directly connected to the motor, carries a movable contact which engages one stationary contact in case the motor speed is abnormally low for lowering the excitation of the motor shunt field winding to increase the motor speed. The movable contact member engages another contact member which is carried by the governor mechanism to complete a circuit for increasing the excitation of the motor shunt field winding in case the motor speed becomes abnormally high. The two contacts which are engaged by the movable contact of the centrifugal governor are aligned with the axis of rotation of the governor and the movable contact has a movement in line with the axis of rotation of the governor.

A relay is provided for operating an alarm circuit in case the motor runs at abnormally high or abnormally low speed. The coil of the relay which controls the alarm circuit is connected in shunt to the shunt field winding by the centrifugal governor when the speed of the motor is abnormally low. The coil of such relay is connected in shunt to a resistance element in series with the motor shunt field winding by the centrifugal governor when the motor speed is abnormally high.

The auxiliary control circuits which are operated by the centrifugal governor only become operative when the motor speed is abnormally low or abnormally high. However, when the auxiliary control circuits become operative, the precision regulation of the motor by the vacuum tube circuits is overpowered and the motor speed is controlled by varying the excitation of the shunt field winding.

The single figure in the accompanying drawing is a diagrammatic view of regulator circuits constructed in accordance with the invention.

Referring to the drawing a motor 1, comprising an armature 2, a shunt field winding 3, and a regulator field winding 4, is operated from a source of current 5. The armature 2 is directly connected across the source 5 and the shunt field winding is connected across the source 5 in series with a resistance element 6.

An alternating current generator 9 of the inductor type is directly connected to the motor 1. The generator 9 comprises an armature winding 10 and a field winding 11. The field winding 11 is connected to a source of power 13 in circuit with the source 5 which is connected to the motor 1. The armature winding 10 of the generator 9 is connected by a transformer 14 to the input circuit of a thermionic amplifier tube 15. The amplifier tube 15 has a limited power output for assisting in the control of the excitation of the regulating field winding 4. Heating current for the filament of the tube 15 is obtained from the source 5 and grid bias for the grid of the tube 15 is obtained across resistance elements 8 and 20. A condenser 12 is connected across the resistance element 20 to provide a low impedance path for alternating potentials.

The amplifier tube 15 is connected to a Wheatstone bridge circuit 21 which controls a phase detector tube 22 and two regulator amplifier tubes 23 and 24. The two regulator amplifier tubes 23 and 24 are directly connected to the regulating field winding 4 and serve to control the excitation of the regulating field winding 4 to maintain the motor speed substantially constant with close precision.

The Wheatstone bridge circuit 21 comprises a resistance arm 25, two arms 26 and 27 which form the secondary winding of a transformer 28 and resonant arm 29. The resonant arm 29 of the bridge circuit comprises an inductance element 30 and a condenser 31 which are tuned to the frequency of the generator 9 when the motor 1 is operating at normal speed.

The primary winding 32 of the transformer 28 is connected to the output circuit of the amplifier tube 15 in parallel with the primary winding 33 of a transformer 34. The transformer 34 supplies alternating potential to the plate of the phase detector tube 22. A battery 36 supplies plate potential to the amplifier tube 15.

The input circuit of the phase detector tube 22 is connected to two opposite vertices of the Wheatstone bridge circuit 21 by means of an output transformer 40. The grid of the phase detector tube has a potential impressed thereon from the bridge circuit which varies in phase and amplitude according to the frequency variations of the current developed by the pilot generator 9. The transformer 34 is provided with a secondary winding 41 which is connected to the plate of a phase detector tube 22. Thus, the plate of the phase detector tube has alternating potential impressed thereon directly from the amplifier tube 15 and the grid of the phase detector tube has alternating current impressed thereon from the Wheatstone bridge circuit which varies in phase according to the variations in speed of the motor 1. The output from the phase detector tube 22 therefore varies in accordance with phase relation between the potentials impressed on the grid and plate thereof and in accordance with the variations in speed of the motor 1. For a more detailed description of the operation of the phase detector tube 22 and the Wheatstone bridge circuit 21, reference may be made to the above mentioned patent to E. R. Morton No. 1,788,733.

The two regulator amplifier tubes 23 and 24 are connected in parallel circuit relation between phase detector tube 22 and the motor regulator field winding 4. The input circuits of the two regulator tubes 23 and 24 are coupled to the phase detector tube 22 by means of a coupling resistance 51. A positive potential with respect to the potentials on the filaments of the regulator tubes 23 and 24 is impressed on the grids of such regulator tubes by the source of current 5. Plate potential for the regulator tubes 23 and 24 is provided by the source 36. A condenser 53 is connected across the coupling resistance 51 for stabilizing the regulating operation and for preventing hunting action as described in the above mentioned patent to E. R. Morton.

If the motor 1 tends to increase in speed the generator 9 is operated to raise the frequency of the current supplied to the amplifier 15 and to the Wheatstone bridge circuit 21. The Wheatstone bridge circuit 21 varies the phase relation of the potential impressed on the grid of the phase detector tube 22 with respect to the potential impressed upon the plate of such tube to lower the output from the phase detector tube. The potential drop across the coupling resistance 51 is lowered for reducing the negative potential on the regulator tube grids to increase the output from the regulator amplifier tubes 23 and 24. The increased output from the regulator tubes increases the current flow through the regulating field winding 4 to oppose the tendency of the motor to increase in speed.

If the speed of the motor 1 tends to decrease the generator 9 is operated to supply a current having a lower frequency to the amplifier 15, the Wheatstone bridge circuit 21 and the plate circuit of the phase detector tube 22. The lower frequency current of the generator 9 operates the Wheatstone bridge circuit 21 to change the phase relation between the potentials impressed on the grid and plate of the detector tube 22 and to increase the output from the phase detector tube. The increased output from the phase detector tube 22 increases the drop across the coupling resistance 51 to increase negative potential impressed on the grids of the regulator tubes 23 and 24. The reduced output from the regulator tubes lowers the excitation of the regulating field winding 4 to oppose the tendency of the motor to lower speed operation.

Grid biasing potential for the phase detector tube 22 and the regulator tubes 23 and 24 is obtained from the source 5 to compensate for the changes in voltage of the current supplied to the motor 1. The grid of the phase detector tube 22 receives a negative bias with respect to the potential of the filament of said tube from the source 5 whereas the grids of the regulator tubes 23 and 24 receive a positive bias with respect to the potentials on the filaments of such regulator tubes. A change in the voltage of the source 5 tends to change the regulator field winding 4 by changing the initial positive bias of the grids of the regulator tubes 23 and 24 and the negative bias on the grid of the phase detector tube 22. The change in the grid bias on the phase detector tube 22 and the regulator tubes 23 and 24 tend to change the excitation of the regulating field of the motor so as to compensate for the changes in a voltage of the power supplied to the motor. The circuits described above are the precision regulating circuits for the motor which serve normally to hold the motor at constant speed with very close precision. Auxiliary regulator circuits are provided for controlling the excitation of the shunt field winding 3 of the motor in case of failure of the precision regulating circuits to hold the motor speed within predetermined limits. In case the motor speed becomes abnormally low or abnormally high the auxiliary regulating circuits overpower the precision regulating circuits and roughly maintain the motor speed substantially constant.

The auxiliary regulating circuits comprise a centrifugal governor 60 which is operated according to the speed of the motor 1. The governor 60 preferably is directly connected to the motor 1. The centrifugal governor 60 comprises three contact members 61, 62 and 63 which are aligned with the axis of rotation of the governor. The contact member 61 is moved along the axis of rotation according to the speed of the motor. If the motor speed becomes abnormally low the contact member 61 engages the contact member 62 for completing a circuit to increase the motor speed. If the motor speed becomes abnormally high the contact member 61 engages the contact member 63 to complete a circuit for reducing the motor speed.

A relay 64 is provided for closing an alarm circuit 65 in case the motor speed becomes abnormally low or abnormally high. One terminal of the coil of the relay 64 is connected to the movable contact member 61 of the centrifugal governor in order to effect operation of the relay 64 and closing of the alarm circuit whenever the contact member 61 engages the contact member 62 or the contact member 63. When the contact member 61 engages the contact member 62, the coil of the relay 64 is connected in shunt to the shunt field winding 3 to decrease the excitation of the shunt field winding 3 and thus to increase the speed of the motor 1. When the motor 1 tends to operate at abnormally high speed the contact member 61 engages the contact member 63 to connect the coil of the relay 64 in shunt to the resistance element 6 which is in series with the shunt field winding 3. The connecting of the coil 64 in shunt to the resistance 6 tends to increase the excitation of the shunt field winding 3 to reduce the speed of the motor.

The regulator circuits associated with shunt field winding 3 are adjusted so that upon operation of the centrifugal governor 60 to complete any of the auxiliary regulator circuits the precision regulator circuits which control the regulating field winding 4 are overpowered. When the precision regulator circuits are overpowered, the shunt field winding excitation is controlled by the operation of the centrifugal governor to roughly hold the motor speed substantially constant.

Modifications in the circuits and in the arrangement and location of parts may be made within the spirit and scope of the invention and such modifications are intended to be covered by the appended claims.

What is claimed is:

1. In a control system, a motor having a regulating field winding and a shunt field winding, a resistance element in series circuit with said shunt field winding, means for controlling said regulating field to maintain the motor speed constant with close precision, a relay controlling an auxiliary circuit, and auxiliary control means more powerful than the precision control means, normally inactive when the motor is held at constant speed by said control means and operative in case of failure of said first mentioned means to hold the motor speed constant for connecting the coil of said relay in shunt to the shunt field winding when the motor operates below normal speed and for connecting the coil of said relay in shunt to said resistance element when the motor operates above normal speed.

2. In a control system, a motor having a regulating field winding and a shunt field winding, a resistance element in series circuit with said shunt field winding, means for controlling said regulating field winding to maintain the motor speed constant with close precision, an electromagnetic relay for controlling an alarm circuit, and auxiliary control means operative in case of failure of said first mentioned means to hold the motor speed constant for connecting the coil of said relay around the shunt field winding in case the motor operates below normal speed and for connecting the coil of said relay around said resistance element in case the motor operates above normal speed.

3. In a control system, a motor having a regulating field winding and a shunt field winding, means for controlling said regulating field winding to maintain the motor speed substantially constant, a relay, an alarm circuit controlled by said relay, a centrifugal governor operated according to the speed of said motor, and means controlled by said governor for connecting the coil of said relay to decrease the current flow through the shunt field winding in case the motor speed falls below a predetermined value and for connecting the coil of said relay to increase the current flow through the shunt field winding in case the motor speed rises above a predetermined value.

4. In a control system, a motor having a regulating field winding and a shunt field winding, a resistance element in circuit with said shunt field winding, means for controlling said regulating field winding to maintain the motor speed substantially constant, a relay controlling an auxiliary circuit, a centrifugal governor operated according to the speed of said motor, and means controlled by said governor for connecting the coil of said relay in shunt to said shunt field winding to decrease the motor excitation in case the motor speed falls below a predetermined level and for connecting the coil of said relay in shunt to said resistance element to increase the motor excitation by said shunt field winding in case the motor speed rises above a predetermined level.

5. In a control system, a motor having a regulating field winding and a shunt field winding, a resistance element in circuit with said shunt field windings, means for controlling said regulating field winding to maintain the motor speed substantially constant, an electromagnetic relay for controlling an alarm circuit, a centrifugal governor operated according to the speed of said motor and means controlled by said governor for connecting the coil of said relay across said shunt field winding in case of an abnormal decrease in the motor speed and for connecting the coil of said relay across said resistance element in case of an abnormal increase in the motor speed.

6. In a control system, a motor having a regulating field winding and a shunt field winding, a first resistance element in series with said shunt field winding, means for controlling said regulating field winding to maintain the motor speed substantially constant, a centrifugal governor operated according to the speed of said motor, said governor having front, back and common contact members, a second resistance element having one terminal thereof connected to said common contact element, said governor upon engagement of the common contact element respectively with the front and back contact elements connects the second resistance element in shunt to the shunt field winding and in shunt to said first resistance element respectively for overpowering said regulating field winding to hold the motor speed approximately constant in case of failure of said means for controlling the regulating field.

EDMUND R. MORTON.